March 31, 1936.  H. FRASER  2,035,700
BRAKE FOR OVERHEAD SUSPENDED TRAVELING CARS
Filed June 20, 1934　　5 Sheets-Sheet 3

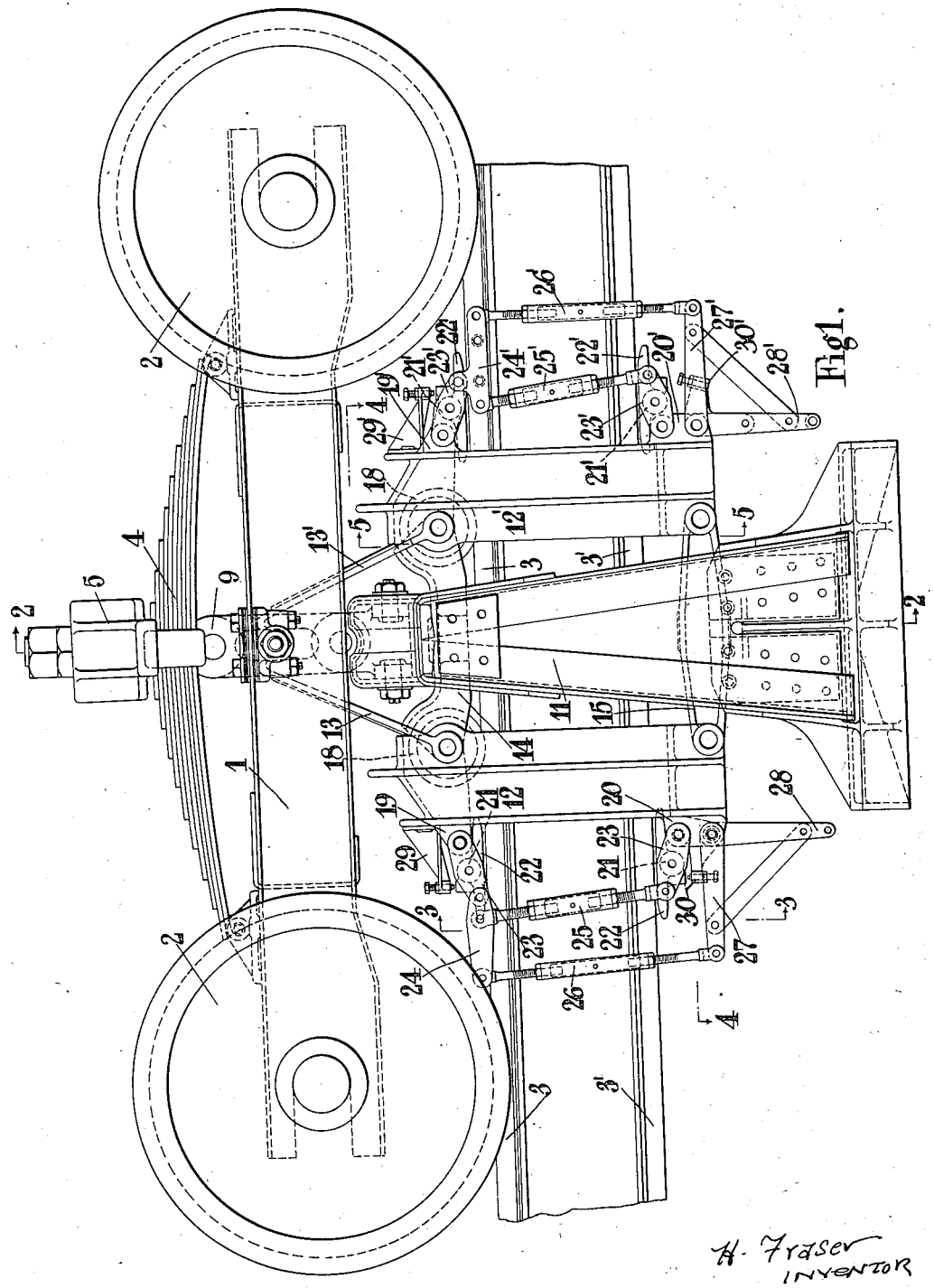

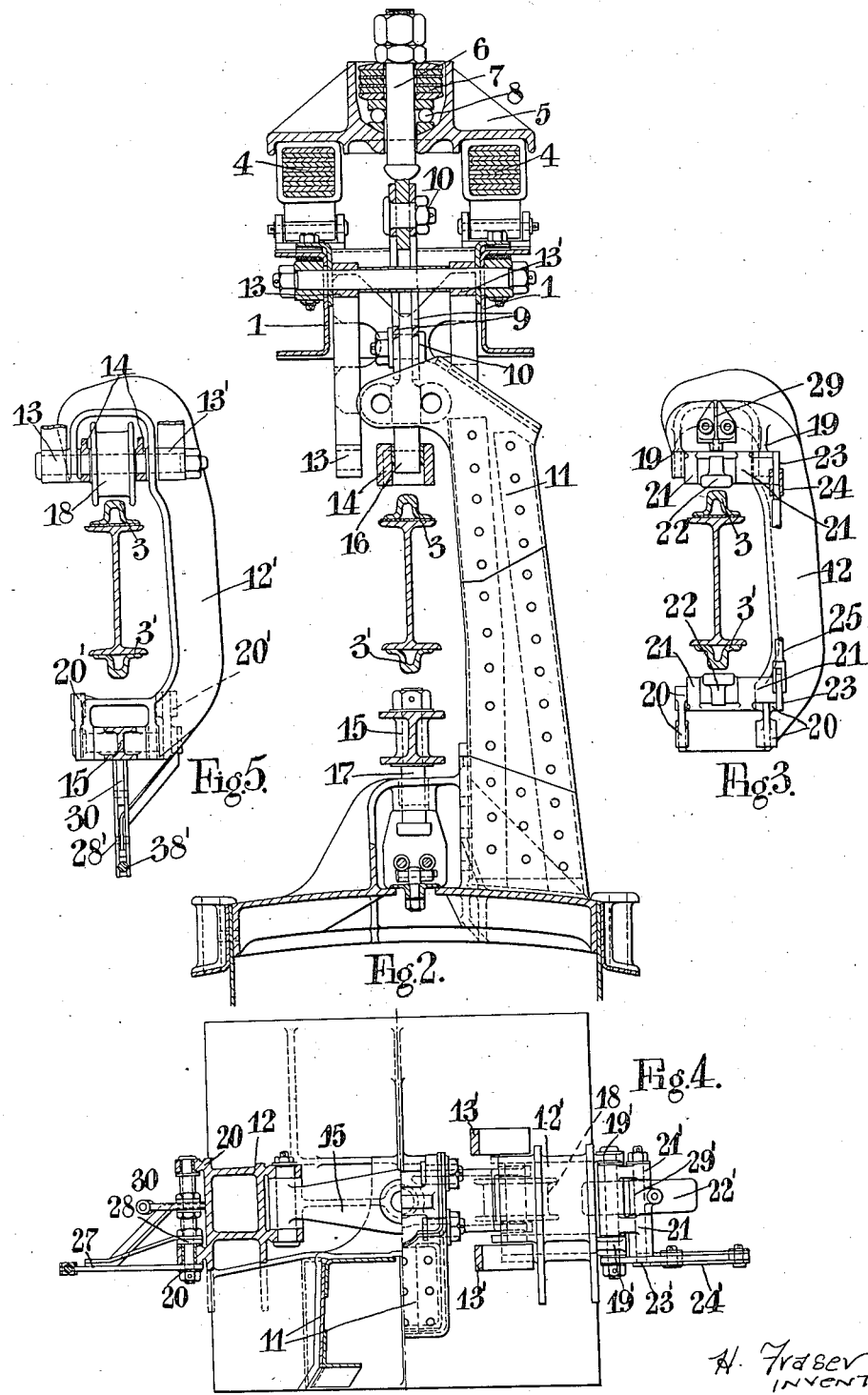

H. Fraser
INVENTOR

By: Marks & Clerk
ATTYS

March 31, 1936.  H. FRASER  2,035,700

BRAKE FOR OVERHEAD SUSPENDED TRAVELING CARS

Filed June 20, 1934  5 Sheets-Sheet 4

H. Fraser
INVENTOR

By Marks & Clark
Attys.

March 31, 1936. H. FRASER 2,035,700
BRAKE FOR OVERHEAD SUSPENDED TRAVELING CARS
Filed June 20, 1934 5 Sheets-Sheet 5

H. Fraser
INVENTOR
By Glascock Downing & Seebold Attys

Patented Mar. 31, 1936

2,035,700

UNITED STATES PATENT OFFICE 2,035,700

BRAKE FOR OVERHEAD SUSPENDED TRAVELING CARS

Hugh Fraser, Burnside, Rutherglen, Scotland, assignor to Inter-Counties Limited, Glasgow, Scotland Application June 20, 1934, Serial No. 731,554
In Great Britain February 21, 1934

6 Claims. (Cl. 188—42)

This invention relates to traveling cars and the like suspended from bogies running upon an overhead track having top and bottom rails and guided by a lower track.

One of the objects of the invention is to provide an efficient braking means operating on the top and bottom rails of the overhead track for controlling the cars.

Another object of the invention is to provide braking means whereby an almost constant pressure can be applied to the brakes irrespective of the variation in depth of rails and rail-bearers, which will not jamb on encountering irregularities and wherein the brake shoes will transmit their braking force directly to the main suspension brackets and not through a system of levers.

Another object of the invention is to provide braking means whereby the brake shoes will bear on the rails irrespective of the irregularities of the rail surfaces.

Other objects of the invention will be apparent from the description herein set forth, and more particularly from the claims at the end thereof.

One embodiment of the invention will now be described by way of example with reference to the accompanying drawings, in which:—

Figure 1 is an elevation of the bogie.

Figure 2 is a section through the brake mechanism in the line 2—2 of Figure 1.

Figure 3 is a section through the brake mechanism in the line 3—3 of Figure 1.

Figure 4 is a sectional plan of Figure 1 on the line 4—4.

Figure 5 is a section on the line 5—5 of Figure 1.

Figure 6:
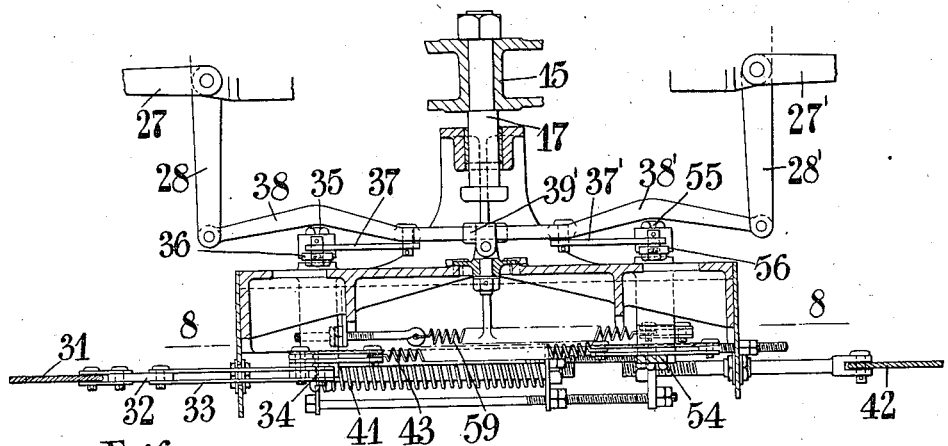
Figure 6 is a sectional elevation of the brake operating mechanism.

The bogie comprises a suitable bogie frame 1 and two track wheels 2 resting on the top rail 3 of an overhead track, provided with a top and bottom rail 3, 3¹, two laminated springs 4 on the bogie frame, a bridge member 5 resting on the top of the said springs, a suspension bolt 6 passing through the bridge member and supported thereon preferably through the intermediary of suitable washers 7, and a thrust ball bearing 8 allowing the suspension bolt 6 easily to turn to any desired extent in a horizontal plane relatively to the bogie frame, and suspension links 9 secured by means of pins or the like 10, to the suspension bolt and to the main suspension bracket 11 of the car, by means of which links the weight of the car is transmitted to the main springs 4 through the intermediary of the means hereinbefore described.

In the arrangement described the brake shoes are used in conjunction with both the top and bottom part of the rail. In the arrangement according to the present invention, both suspensions, at the front and rear part of the car, are provided with a "hand-brake" and an "emergency-brake", each brake comprising two brake shoes, adapted to be applied to the top and bottom part of the rail. Both the hand-brake and the emergency-brake are operated by respective winches provided in the control cabin, each winch operating a pair of brake shoes on each bogie, simultaneously.

The braking mechanism comprises two brackets 12, 12¹ supported by links 13, 13¹ secured to the bogie frame 1 by suitable bolts, and spaced apart at the top and the bottom by horizontal spacing members 14, 15. The main suspension bracket 11 is connected to the spacing members by pins 16, 17 which permit it to move vertically relatively to the bogie but not horizontally.

The brackets 12, 12¹ also carry wheels 18 which take the weight of the car in an emergency should the springs 4 fail. The "hand-brake" is mounted on the left hand bracket 12 (Fig. 1) while the "emergency brake" is mounted upon the right hand bracket 12¹.

Dealing with the hand brake system lugs 19, 20 are provided at the top and bottom of the bracket 12, and pivotally secured to these lugs by a spindle are trunnion members 21 to which are pivotally secured the brake shoes 22 by means of pins. Also pivotally connected to the lugs 19, 20 on the same spindle as the trunnion members are links 23 which are also secured to the trunnion members 21 by pins or the like so that they move with the trunnions. A link 24 is pivotally connected to the upper link 23 and is connected by a turnbuckle and rod 25 to the lower link 23. The end of the link 24 is also connected by a turnbuckle and rod 26 to one arm 27 of a bell crank lever pivotally mounted by a pin to the lug 20, the other arm 28 of which is connected to the operating mechanism hereinafter described.

A suitable bracket 29 is provided with a stop for limiting the movement of the upper brake shoe 22 while another bracket 30 is provided with a stop for limiting the movement of the lower shoe 22.

The emergency brake system has lugs 19¹, 20¹, trunnion members 21¹, brake shoes 22¹ and links 23¹ all similar to the hand brake system, but the link 24¹ is pivoted at an intermediate point to the upper link 23¹ and is then similarly connected by turnbuckles and rod 25¹ to link 23¹ and by turnbuckle and rod 26¹ to bell crank lever 27¹ 28¹. Brackets 29¹ and 30¹ with stops are provided, but the bracket 30¹ is made integral or solidly and connected with the bell crank lever 27¹, 28¹ as it moves in the opposite direction to that of the hand brake.

The arrangements of the hand-brake and emergency-brake are such that the turning of the bell-crank levers in the one direction, to the left of Figure 1, causes the brake shoes to be applied to the rail and the turning in the opposite direction, causes them to be moved away therefrom.

Figure 7:
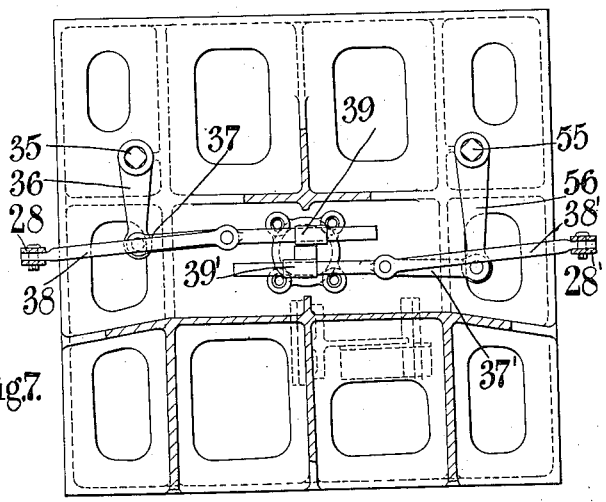
Figure 7 is a plan of Figure 6.
Figures 10, 11:
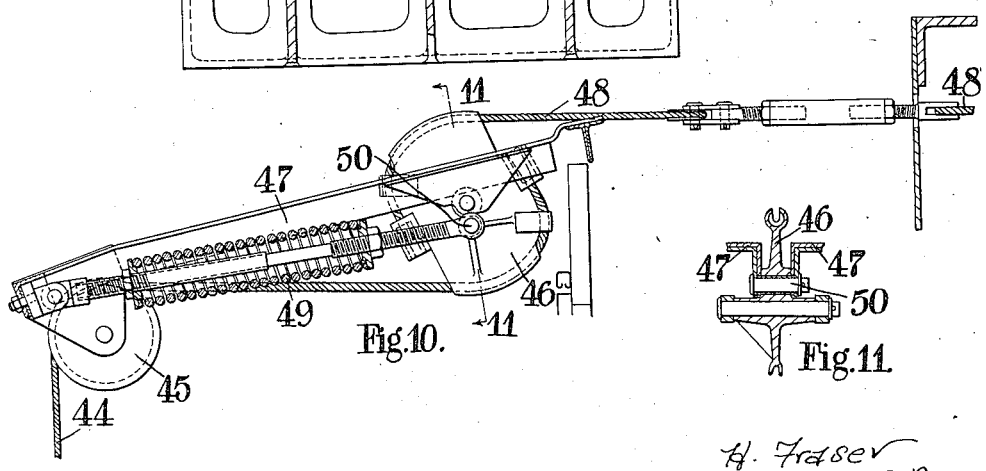
Figure 10 is the emergency brake mechanism.
Figure 11 is a section on the line 11—11 of Figure 10.
Figure 8:
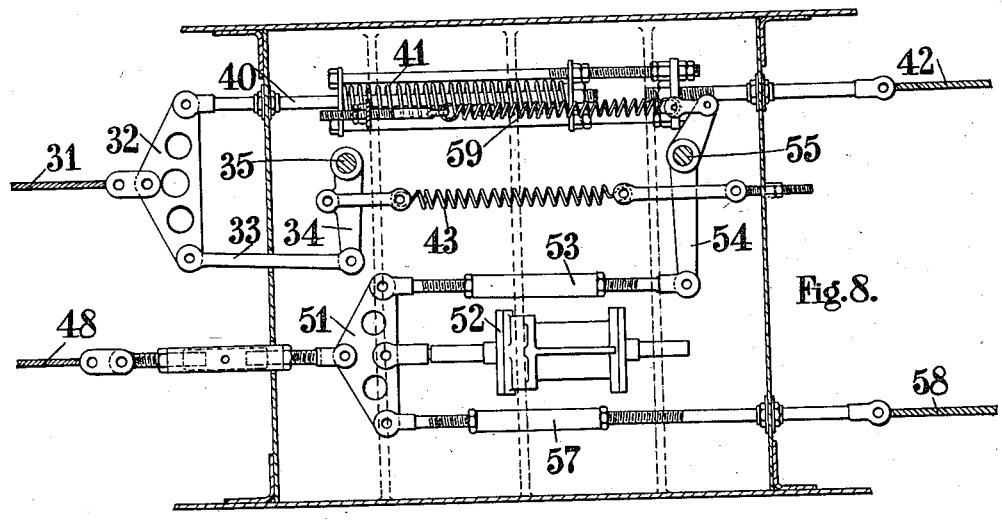
Figure 8 is a sectional plan of Figure 6 on the line 8—8.
Figure 9:
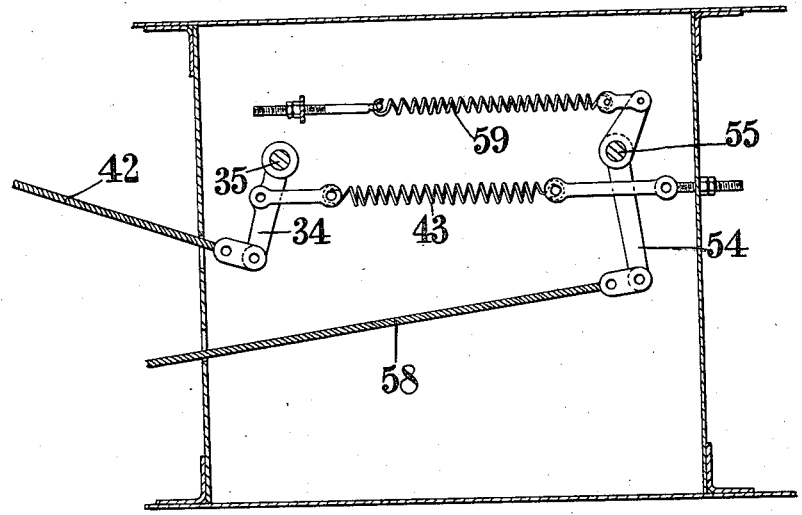
Figure 9 is a plan of the rear brake operating mechanism.
Figure 12:
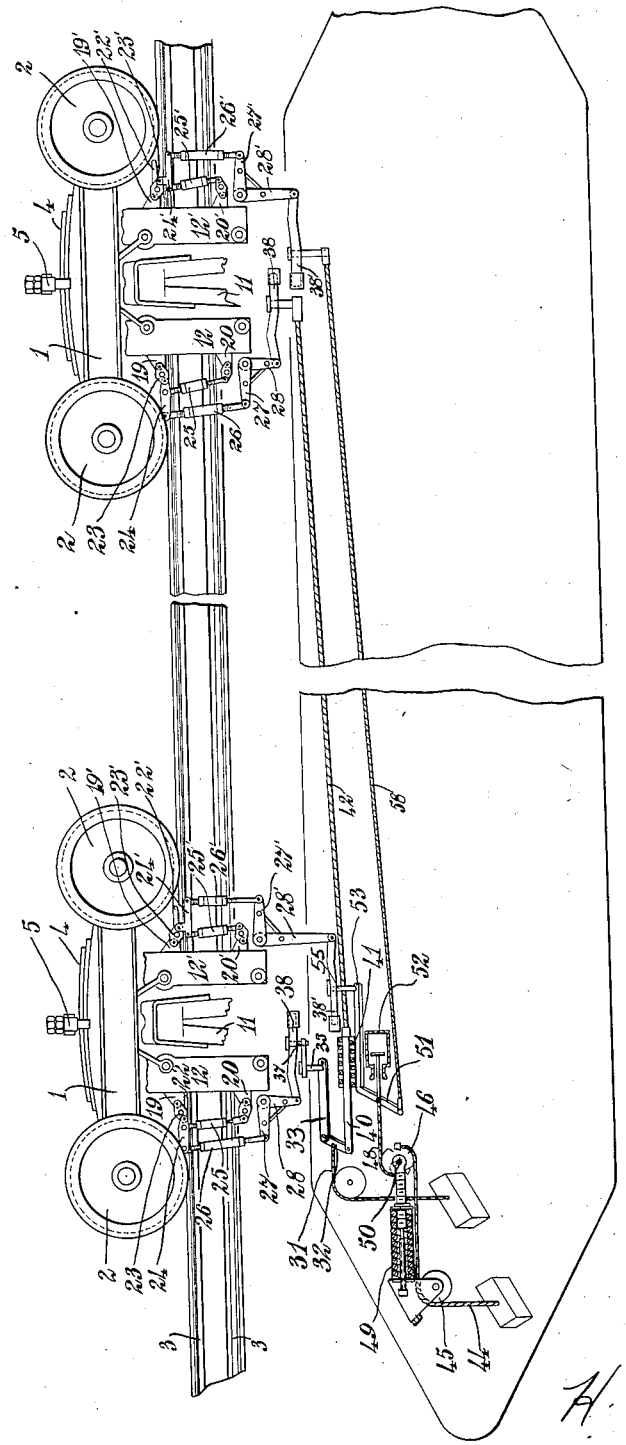
Figure 12 shows diagrammatically a traveling car, bogies supporting the car and running on an overhead rail and the improved braking means.

The mechanism by which the bell crank levers are operated from the winches provided in the control cabin, will now be described with reference to Figures 6 to 11.

For the purpose of applying the hand-brakes of both bogies, a wire rope 31 leads from the hand brake winch provided in the control cabin, to a compensating lever 32 (Fig. 8) forming part of the brake mechanism arranged under the corresponding suspensions, which lever, when the rope is hauled by the winch, distributes a pull equal, or in such a ratio as may be determined, to the hand-brakes provided on the forward and rear suspension. The pull of the forward hand-brake is transmitted from the compensating lever, through a tie-rod 33 to the end of an intermediate lever 34, which in its turn transmits its movement through its spindle 35, to another lever 36 (Fig. 7) outside the car. The end of the lever 36 transmits the force through a tie-rod 37 to a push-rod 38 guided in a bearing, 39 and articulated to the arm 28 of the bell crank lever, which operates the forward hand-brakes. In a similar way, the pull to the rear hand-brake is transmitted at the other end of the compensating lever 32 through a rod 40 and compensating spring 41, and through a wire rope 42 passing over a pulley (not shown) in order to give the rope a fair lead, to the end of the rear intermediate lever 34 (Fig. 9) which further transmits the power to the brake shoes in the manner above described. The said compensating spring, 41, which may be pre-set to the maximum force a man can apply, will still yield should a car in its movement along the track under the action of the hand-brakes encounter increased thickness of the rail and rail-bearers.

Spiral tension springs 43 are attached to the intermediate levers 34 referred to, for the purposed of returning the hand-brake shoes to the off position. The attachment of the springs is off the centre, in order to ensure that as the tension of the springs increases, their turning moment shall decrease, so that a practically constant turning moment of the levers, to which the springs are attached, may be maintained throughout their effective movement. This also ensures that the force required to apply the brakes is reduced to a minimum.

As regards the emergency-brakes, one of the main differences between them and the hand-brakes is that the former are held off while the latter are applied to the rail by their respective winches.

The wire rope 44 from the emergency-brake winch in the cabin passes over the pulley 45 and is anchored to the pulley 46 which is pivotally mounted on angle brackets 47. The wire rope 48 passing to the brakes is anchored to the other side of the pulley 46. Two compression springs 49 are arranged one on each side of the pulley 46 which transmit their force to the pulley by means of the pin 50 and move the pulley so that it pulls the rope 48 and puts the brakes in the "on" position. The winch rope 44 acts against the two compression springs and by overcoming their force causing the emergency-brakes to move to the "off" position. The arrangement is such that as the spring is compressed the moment decreases, the object being that the turning moment of the spring shall be as constant as possible so that the emergency-brakes may be moved to the off position by the smallest possible effort being applied to the winch. The force applied by the compression springs to the rope 48 is divided between the forward and rear emergency-brakes by means of a compensating lever 51, a dash-pot 52 (Fig. 8) being arranged to prevent sudden action of the brakes.

The pull of the emergency brake springs is transmitted from the compensating lever 51, through the turnbuckle 53 to the end of the intermediate lever, 54 which in its turn transmits its movement through its spindle 55 to another lever 56 outside the car. The end of the lever 56 transmits its force through a tie rod 37¹ to a push-rod 38¹ guided in a bearing 39¹ articulated to the arm 28¹ of the bell crank lever which operates the forward emergency brakes. In a similar way, the pull to the rear emergency brake is transmitted at the other end of the compensating lever 51 through a turnbuckle and rod 57 and wire rope 58 passing over a pulley (not shown) in order to give the rope a fair lead, to the end of the rear intermediate lever 54 and thence to the brakes similarly to the forward arrangement as above described.

Tension springs 59 are also provided at the forward and rear suspensions, in order to move the gear and brake shoes to the "off" position, when the winch has relieved the main compression springs of the force applied by them. These tension springs are attached off the centre as and for the purpose above referred to, in connection with the spiral tension springs included in the hand-brake mechanism.

I wish it to be understood that although the brake mechanisms hereinbefore described have been stated to be operated by means of winches, the invention is not limited thereto as air or oil cylinders, or electro-magnetic means, may be employed for applying and/or releasing the brakes.

What I claim is:—

1. In traveling cars and the like suspended from bogies running on an overhead track having top and bottom rails, braking means comprising at least one brake supporting bracket carried by a bogie and extending above and below the overhead track, lugs carried by said bracket in proximity to the top and bottom rail, trunnions pivotally supported by said lugs, braking shoes pivotally supported by said trunnions, brake applying means by which said trunnions can be operated to apply simultaneously the brake shoes to the top and bottom rails, and resilient means incorporated in the brake applying means to enable the brake shoes to give on encountering irregularities.

2. In traveling cars and the like suspended from bogies running on an overhead track having top and bottom rails, braking means comprising at least one brake supporting bracket suspended from a bogie and provided with extensions extending above and below the track, lugs carried by said extensions, trunnions carried by said lugs extending substantially horizontally along and in close proximity to the top and bottom rails, brake shoes pivotally carried by said trunnions, their pivots being in substantially horizontal alignment with the pivots of the trunnions, means for operating said trunnions whereby the brake shoes are applied simultaneously to the top and bottom rails, and resilient means incorporated in the brake applying means to enable the brake shoes to give on encountering irregularities.

3. In traveling cars and the like suspended from bogies running on an overhead track having top and bottom rails, braking means comprising at least one brake supporting bracket carried by a bogie and extending above and below the overhead track, lugs carried by said bracket in proximity to the top and bottom rails, trunnions pivotally carried by said lugs, brake shoes pivotally carried by the trunnions, a pivoted link operatively connected to one of said trunnions, brake applying means operatively connected to said link, means operatively connecting said link with the other trunnion so that both brake shoes will be operated in unison, and resilient means incorporated in the brake applying means.

4. In traveling cars and the like suspended from bogies running on an overhead track, braking means comprising at least one brake supporting bracket carried by each of two bogies and extending above and below the track, an upper and lower trunnion pivotally supported by each of said brackets in proximity to the upper and lower rails, brake shoes pivotally carried by said trunnions, brake applying means by which the two upper and two lower trunnions are operated to apply the shoes simultaneously to the upper and lower rails, equalizing means whereby the force applied by the brake operating means is applied to the shoes carried by the two brake supporting members in a predetermined ratio, and resilient means incorporated in said equalizing means.

5. In traveling cars and the like suspended from bogies running on an overhead track having top and bottom rails, braking means comprising two interconnected brake supporting brackets pivotally carried by a bogie, each of said brackets extending above and below the overhead track, lugs carried by both of said brackets in proximity to the top and bottom rails, trunnions pivotally carried by said lugs, brake shoes pivotally carried by the trunnions, a link operatively connected to one of said trunnions carried by each brake supporting member, brake applying means operatively connected to said links, means operatively connecting each link to the other trunnion carried by the same brake supporting bracket, spring means whereby the brake shoes controlled by one of said links are normally held in the off position, spring means normally tending to put the other two brake shoes in the on position, and resilient means incorporated in both brake applying means.

6. In traveling cars and the like suspended from bogies running on an overhead track having top and bottom rails, braking means comprising two rigidly interconnected brake supporting brackets extending above and below the overhead track, means pivotally suspending said brackets from a bogie, two trunnions pivotally secured to each of said brackets, one trunnion being located in proximity to the bottom rail and the other in proximity to the top rail, brake shoes pivotally carried by each of said trunnions, means operatively interconnecting the trunnions of each brake carrying bracket, and brake applying means whereby the trunnions can be operated to apply the shoes to the top and bottom rails.

HUGH FRASER.